United States Patent
Skoglar et al.

(10) Patent No.: US 11,255,829 B2
(45) Date of Patent: Feb. 22, 2022

(54) CHROMATOGRAPHY SYSTEM AND A METHOD THEREFOR

(71) Applicant: Cytiva Sweden AB, Uppsala (SE)

(72) Inventors: Helena Skoglar, Uppsala (SE); Bjorn Olovsson, Uppsala (SE)

(73) Assignee: CYTIVA SWEDEN AB, Uppsala (SE)

(*) Notice: Subject to any disclaimer, the term of this patent is extended or adjusted under 35 U.S.C. 154(b) by 163 days.

(21) Appl. No.: 15/763,520

(22) PCT Filed: Sep. 29, 2016

(86) PCT No.: PCT/EP2016/073270
§ 371 (c)(1),
(2) Date: Mar. 27, 2018

(87) PCT Pub. No.: WO2017/055460
PCT Pub. Date: Apr. 6, 2017

(65) Prior Publication Data
US 2018/0275104 A1  Sep. 27, 2018

(30) Foreign Application Priority Data
Sep. 30, 2015 (GB) .................................. 1517282

(51) Int. Cl.
*G01N 30/38* (2006.01)
*G01N 30/74* (2006.01)
(Continued)

(52) U.S. Cl.
CPC ......... *G01N 30/38* (2013.01); *B01D 15/1885* (2013.01); *G01N 30/20* (2013.01);
(Continued)

(58) Field of Classification Search
CPC .... G01N 30/38; G01N 35/1097; G01N 30/78; G01N 30/20; G01N 30/74; G01N 30/42;
(Continued)

(56) References Cited

U.S. PATENT DOCUMENTS

| 4,254,656 A | 3/1981 | Sanford et al. |
|---|---|---|
| 9,921,197 B2 | 3/2018 | Yu |

(Continued)

FOREIGN PATENT DOCUMENTS

| JP | 06-094697 A | 4/1994 |
|---|---|---|
| WO | 2015/094096 A1 | 6/2015 |

OTHER PUBLICATIONS

PCT International Search Report and Written Opinion for PCT Application No. PCT/EP2016/073270 dated Jan. 10, 2017 (10 pages).

(Continued)

*Primary Examiner* — Nimeshkumar D Patel
*Assistant Examiner* — Gedeon M Kidanu
(74) *Attorney, Agent, or Firm* — Eversheds Sutherland (US) LLP

(57) ABSTRACT

The present invention relates to a chromatography system and a method therefor. The chromatography system comprising an inlet port (102) for receiving a sample, an outlet port (106) for delivering the sample, a detector (201), a column (104), and a valve (202) in fluid communication with the inlet port, the outlet port, the detector, and the column. The valve (202) comprises a first position (304) wherein the inlet port is in fluid communication with the outlet port via a first fluid path comprising the detector and the column, wherein the detector is arranged upstream the column. The valve comprises a second position (404) wherein the inlet port is in fluid communication with the outlet port via a second fluid path comprising the detector and the column, wherein the detector is arranged downstream the column.

9 Claims, 4 Drawing Sheets

(51) Int. Cl.
    *G01N 30/20*    (2006.01)
    *G01N 30/78*    (2006.01)
    *G01N 35/10*    (2006.01)
    *B01D 15/18*    (2006.01)
    *G01N 30/62*    (2006.01)
    *G01N 30/42*    (2006.01)

(52) U.S. Cl.
    CPC ............. *G01N 30/74* (2013.01); *G01N 30/78* (2013.01); *G01N 35/1097* (2013.01); *B01D 15/1807* (2013.01); *G01N 30/42* (2013.01); *G01N 2030/202* (2013.01); *G01N 2030/385* (2013.01); *G01N 2030/626* (2013.01)

(58) Field of Classification Search
    CPC ....... G01N 2030/626; G01N 2030/385; G01N 2030/202; B01D 15/1885; B01D 15/1807
    See application file for complete search history.

(56) References Cited

U.S. PATENT DOCUMENTS

| | | | |
|---|---|---|---|
| 2010/0058841 A1* | 3/2010 | Wilen | G01N 35/1097 73/61.56 |
| 2012/0091063 A1* | 4/2012 | Bangtsson | G01N 30/78 210/656 |
| 2013/0089186 A1 | 4/2013 | Payne et al. | |
| 2013/0213884 A1* | 8/2013 | Lacki | B01D 15/1871 210/635 |
| 2014/0305195 A1* | 10/2014 | Blaschyk | G01N 30/32 73/61.56 |
| 2015/0233479 A1* | 8/2015 | Bjernulf | G01N 35/1097 137/625.23 |
| 2017/0153210 A1* | 6/2017 | Eriksson | B01D 15/34 |
| 2019/0083901 A1* | 3/2019 | Tarafder | G01N 30/34 |

OTHER PUBLICATIONS

GB Search Report for GB Application No. 1517282.8 dated Jun. 30, 2016 (2 pages).
Japanese Office Action for JP Application No. 2018-516474 dated Jun. 9, 2020 (8 pages with English translation).
Chinese Office Action for CN Application No. 201680056653.9 dated Nov. 19, 2019 (15 pages with English translation).

\* cited by examiner

CHROMATOGRAPHY SYSTEM AND A METHOD THEREFOR

CROSS REFERENCE TO RELATED APPLICATIONS

This application claims the priority benefit of PCT/EP2016/073270 filed on Sep. 29, 2016 which claims priority benefit of Great Britain Application No. 1517282.8 filed Sep. 30, 2015. The entire contents of which are hereby incorporated by reference herein.

TECHNICAL FIELD

The present invention relates to a chromatography system and a method therefor. In particular the present invention relates to a chromatography system and a method for measuring by means of a detector.

BACKGROUND

In continuous chromatography such as for example periodic counter-current (PCC) chromatography it is of great importance to precisely determine the timing for stopping sample loading and continue with the next step in the PCC process.

In order to determine the optimal timing for stopping sample loading it is known to utilize a pre-column detector for measuring properties of a sample before entering the column. The output from the column passes through a post-column detector in order to detect the properties due to the process in the column. The difference between the pre-column detector signal and the post-column detector signal is indicative of the process in the column. However, if the process time is long problems with detector drift and calibration may cause measurement errors which results in non-optimal sample loading.

The detected properties are often optical properties of the sample, which may be detected by means of an optical detector. In the art it is common to use a ultra-violet (UV) light source and a detector for the received light intensity in order to determine the light absorbance. This detection of light absorbance requires well calibrated sources and detectors. However, these detectors and light sources are prone to drift due to for example temperature and time. This causes a problem in the known setup, which uses a pre-column detector and a post-column detector that are pronce to drift. The problem with drift is pronounced when the light absorbance difference before processing in the column and after processing in the column is small.

It is an object of the present invention to provide a chromatography system that solves at least a part of the above problems.

A further object is to provide a chromatography system and a method with improved accuracy.

An additional object is to provide a chromatography system and a method with an improved calibration.

GENERAL DESCRIPTION OF THE INVENTION

One or more of the above objects, and further possible objects that can be construed from the disclosure below, are met by a first aspect of the invention constituted by a chromatography system comprising an inlet port for receiving a sample, an outlet port for delivering the sample, a detector, a column, and a valve in fluid communication with the inlet port, the outlet port, the detector, and the column. The valve comprises a first position wherein the inlet port is in fluid communication with the outlet port via a first fluid path. The first fluid path comprising the detector and the column. The detector is arranged upstream the column. The valve further comprises a second position wherein the inlet port is in fluid communication with the outlet port via a second fluid path. The second fluid path comprising the detector and the column, wherein the detector is arranged downstream the column.

The above objects and further possible objects are further met by a second aspect of the invention constituted by a method for a chromatography system, wherein the system comprises an inlet port and an outlet port. The method comprising connecting a first flowpath between the inlet port and the outlet port. The first flowpath comprises a detector and a column, wherein the detector is arranged upstream the column. The method further comprises measuring a first detector value, upon connecting the first flowpath. The method comprises connecting a second flowpath between the inlet port and the outlet port, wherein the second flowpath comprises the detector and the column. The detector is arranged downstream the column. The method further comprises measuring a second detector value, upon connecting the second flowpath.

Additional or alternative features of the first aspect are described below.

The detector may be a light absorbance detector. This means that the properties of the sample can be measured in an indirect way without direct contact with the sample.

The light absorbance detector may be a UV detector. This has the effect that some important properties of a sample are easily obtained.

The chromatography system may comprise a further detector connected between the inlet port and the valve. This may have the effect that calibration is easily performed by connecting the detector and the further detector in serie and perform calibration measurements.

The valve may be a rotary valve. This has the effect that the chromatography system can efficiently be integrated without unnecessary tubings and fittings. Furthermore, a rotary valve may easily be maneuvered by a drive mechanism, such as a stepper motor or a servo drive.

Below, alternative or additional features of the second aspect are presented.

The method may further comprise determining the difference between the first detector value and the second detector value. This has the effect that the relative detector value is obtained.

The system may comprise a further detector arranged upstream the inlet port, and the method may further comprise measuring a third detector value by means of the further detector, upon connecting the first flowpath. The method may further comprise measuring a fourth detector value by means of the further detector, upon connecting the second flowpath. This has the effect that when the first flowpath is connected both the detector and the further detector provides measurements of the sample before processing, which means that they can be calibrated against each other. When the second flowpath is connected the further detector is configured as a pre-column detector and the detector is configured as a post-column detector.

The method for a chromatography system may further comprise calculating a difference between the third detector value and the first detector value. This has the effect that calibration is easily performed between the detector and the further detector.

The method for a chromatography system may further comprise calculating a difference between the fourth detector value and the second detector value. This has the effect that the change of optical properties may be calculated.

BRIEF DESCRIPTION OF THE DRAWINGS

In the following description of embodiments of the invention, reference will be made to the accompanying drawings of which.

DETAILED DESCRIPTION OF EMBODIMENTS OF THE INVENTION

Figure 1:
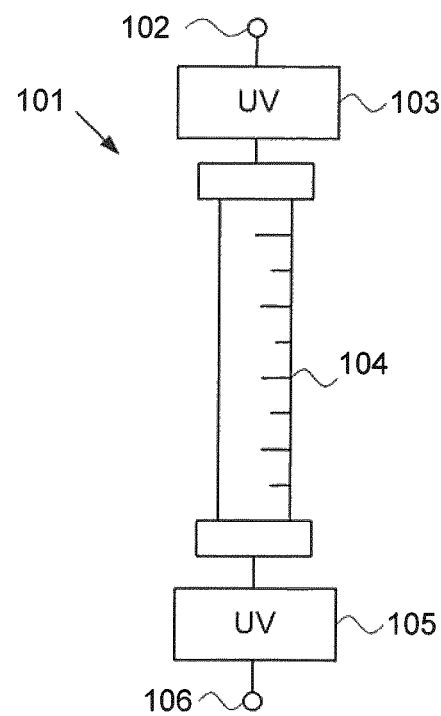
FIG. 1 is a prior-art chromatography system with a pre-column detector, a column, and a post-column detector.

The embodiments of this disclosure will now be described more fully hereinafter with reference to the accompanying drawings, in which different example embodiments are shown. These example embodiments are provided so that this disclosure will be thorough and complete and not for purposes of limitation. In the drawings, like reference signs refer to like elements.

In FIG. 1 a prior-art chromatography system, generally designated 101, is schematically illustrated. The chromatography system 101 comprises an inlet port 102 configured to receive a sample. The inlet port 102 is in fluid communication with a pre-column detector 103. The pre-column detector 103 may be a light absorbance detector, which in one embodiment may be a UV detector. The pre-column detector 103 is configured to detect the light absorbance of the sample before processing in a column 104. The column 104 is in fluid communication with a post column detector 105, which may be configured to detect the light absorbance of the sample after processing in the column 104. The post column detector 105 is in fluid communication with an outlet port 106, which is provided to deliver the processed sample. The difference between the light absorption detected by the pre-column detector and the light absorption detected by the post-column detector is indicative of the process in column 104.

Figure 2:
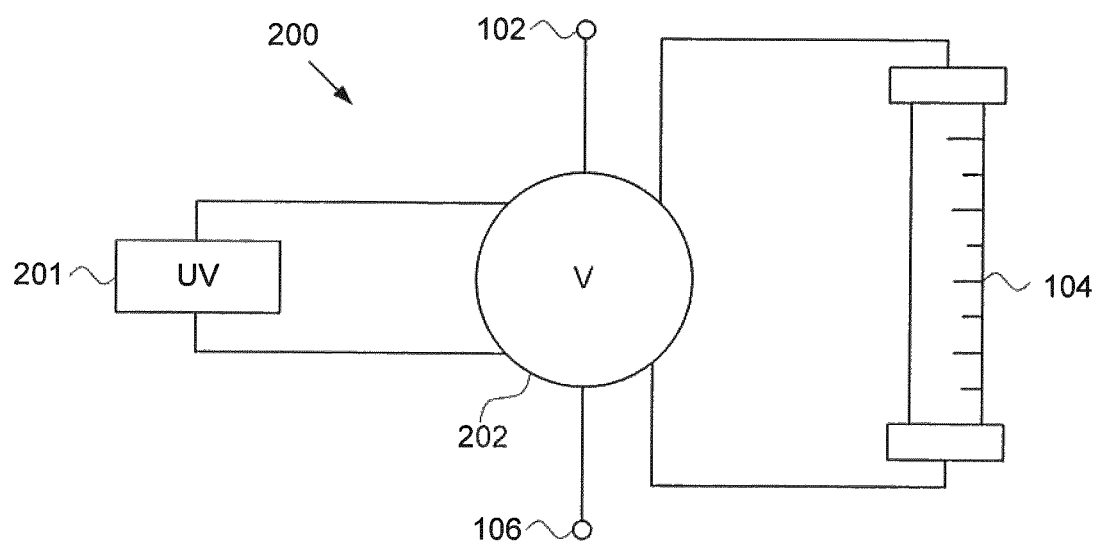
FIG. 2 is an illustration of a chromatography system according to a first embodiment.

A first embodiment of the present invention is schematically illustrated in FIG. 2. This first embodiment comprises an inlet port 102, an outlet port 106, a valve 202, a column 104, and a detector 201. The inlet port 102 is in fluid communication with the outlet port 106 via the valve 202. The detector 201 is in fluid communication with the valve 202, and the column 104 is in fluid communication with the valve 202.

The detector 201 may be a light absorbance detector such as a UV detector.

Figure 3:
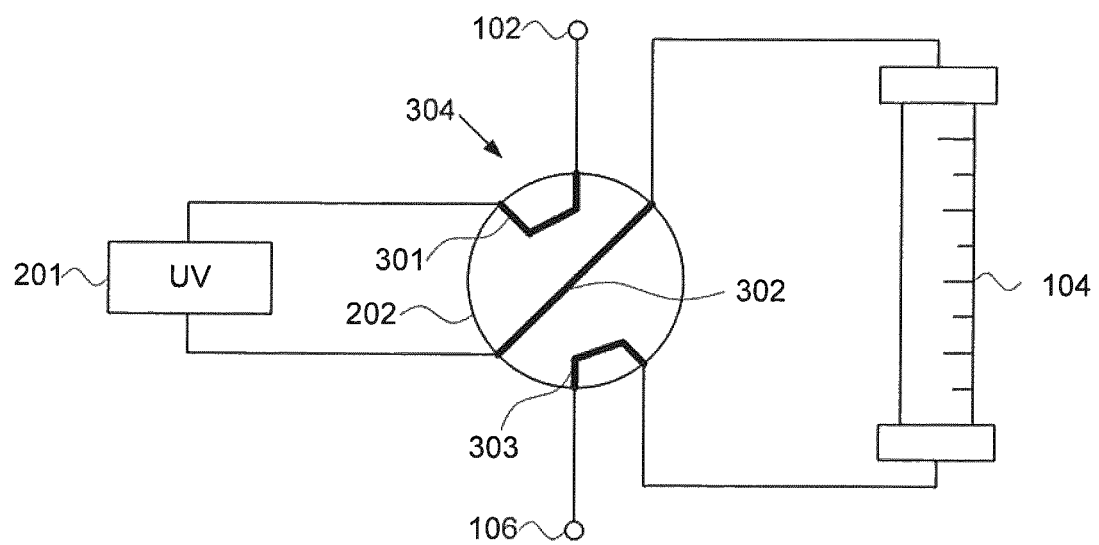
FIG. 3 is an illustration of the chromatography system according to the first embodiment in a first position.

The valve 202 will now be described with reference made to FIG. 3.

The valve 202 comprises a first position 304 with:
a first fluid connection 301 which connects the inlet port 102 to the input of the UV detector 201;
a second fluid connection 302 which connects the output from the UV detector 201 to the input of the column 104; and
a third fluid connection 303 which connects the column 104 to the outlet port 106.

Figure 4:
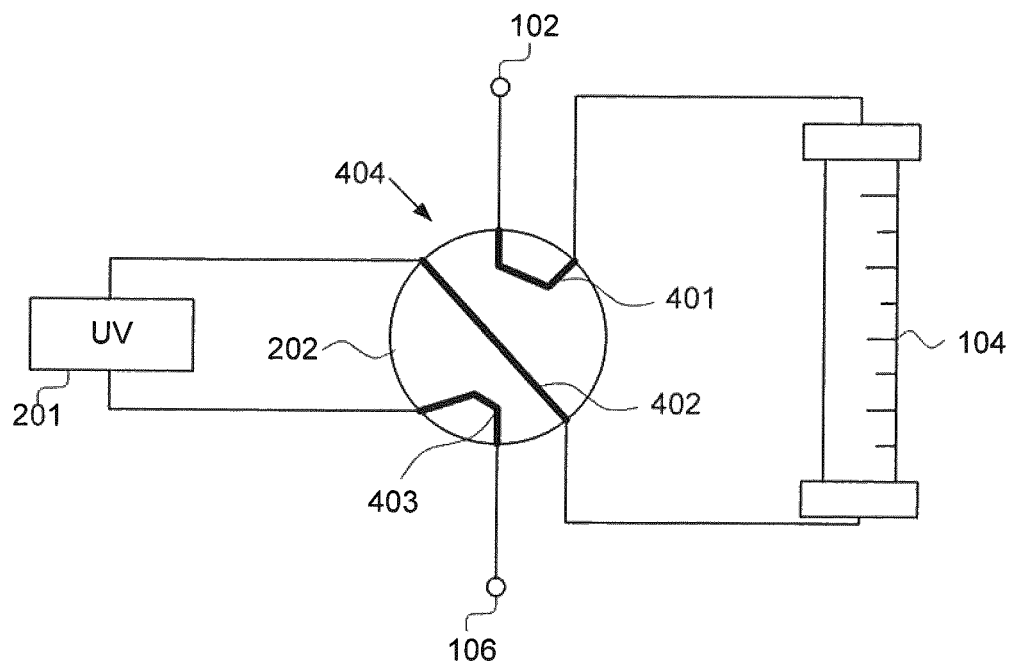
FIG. 4 is an illustration of the chromatography system according to the first embodiment in a second position.

Furthermore, the valve 202 comprises a second position 404, illustrated in FIG. 4, with:
a fourth fluid connection 401 which connects the inlet port 102 to the input of the column 104;
a fifth fluid connection 402 which connects the output from the column 104 to the input of the UV detector 201; and
a sixth fluid connection 403 which connects the output of the UV detector 201 to the outlet port 106.

The present invention is based on the insight that by providing a valve that comprises a first position wherein the inlet port is in fluid communication with the outlet port via a first fluid path comprising the detector and the column, wherein the detector is arranged upstream the column. This first position causes the UV detector to be configured as a pre-column detector.

The valve further comprises a second position wherein the inlet port is in fluid communication with the outlet port via a second fluid path comprising the detector and the column, wherein the detector is arranged downstream the column. The second position causes the UV detector to be configured as a post-column detector.

Thus by maneuvering the valve 202 between the first position and the second position the UV detector may act as a pre-column detector or a post-column detector. By switching between these two positions light absorbance measurements can be performed in a short time interval both in a pre-column configuration and in a post-column configuration, which may minimize the problem associated with drift.

In a preferred embodiment the valve 202 is a rotary valve, since such a valve may minimize the amount of tubing needed to establish the first fluid path and the second fluid path. Furthermore, a rotary valve is easy to control by means of a drive mechanism, such as a stepper motor or a servo motor.

By connecting a further detector upstream the inlet port 102 several different configurations are possible.

If the valve 202 is in the first position the further detector and the detector 201 are both upstream the column 104 which means that the detector 201 and the further detector may be calibrated against each other a so called cross-calibration.

If the valve 202 is maneuvered to the second position the further detector is in a pre-column position and the detector 201 is in the post-column position.

Thus the addition of a further detector enables reliable and fast cross calibration of the further detector and the detector.

Figure 5:
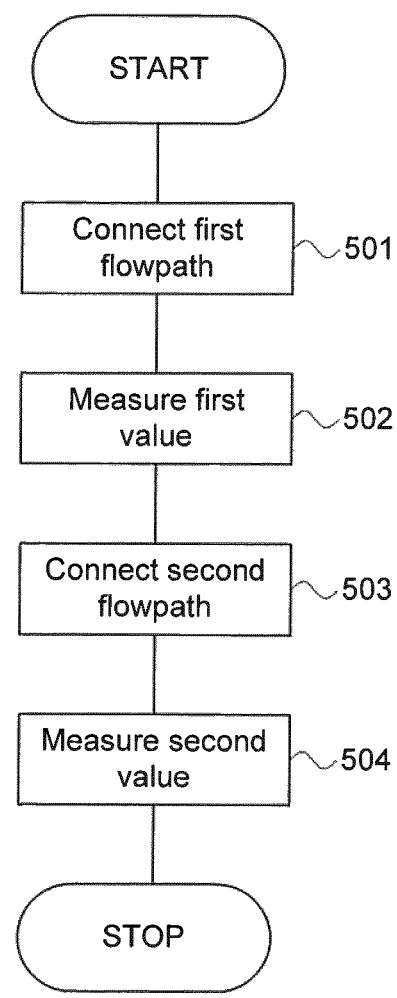
FIG. 5 is an illustration of a method for a chromatography system according to the second embodiment.

In FIG. 5 a flowchart illustrating a method according to the present invention is disclosed. The method comprising:
Connecting 501 a first flowpath between the inlet port and the outlet port, wherein the first flowpath comprises a detector and a column, wherein the detector is arranged upstream the column.
Measuring 502 a first detector value, upon connecting the first flowpath.
Connecting 503 a second flowpath between the inlet port and the outlet port, wherein the second flowpath comprises the detector and the column, wherein the detector is arranged downstream the column.
Measuring 504 a second detector value, upon connecting the second flowpath.

The method may further comprise:
Determining the difference between the first detector value and the second detector value.

The system may further comprise a further detector arranged upstream the inlet port, and the method may further comprise:
Measuring a third detector value by means of the further detector, upon connecting the first flowpath.
Measuring a fourth detector value by means of the further detector, upon connecting the second flowpath.

The method may further comprise:
Calculating a difference between the third detector value and the first detector value.

The method for a chromatography system may further comprise:
Calculating a difference between the fourth detector value and the second detector value.

The method disclosed with reference made to FIG. 5 allows easy calibration and a decreased problem with drift.

Figure 6:
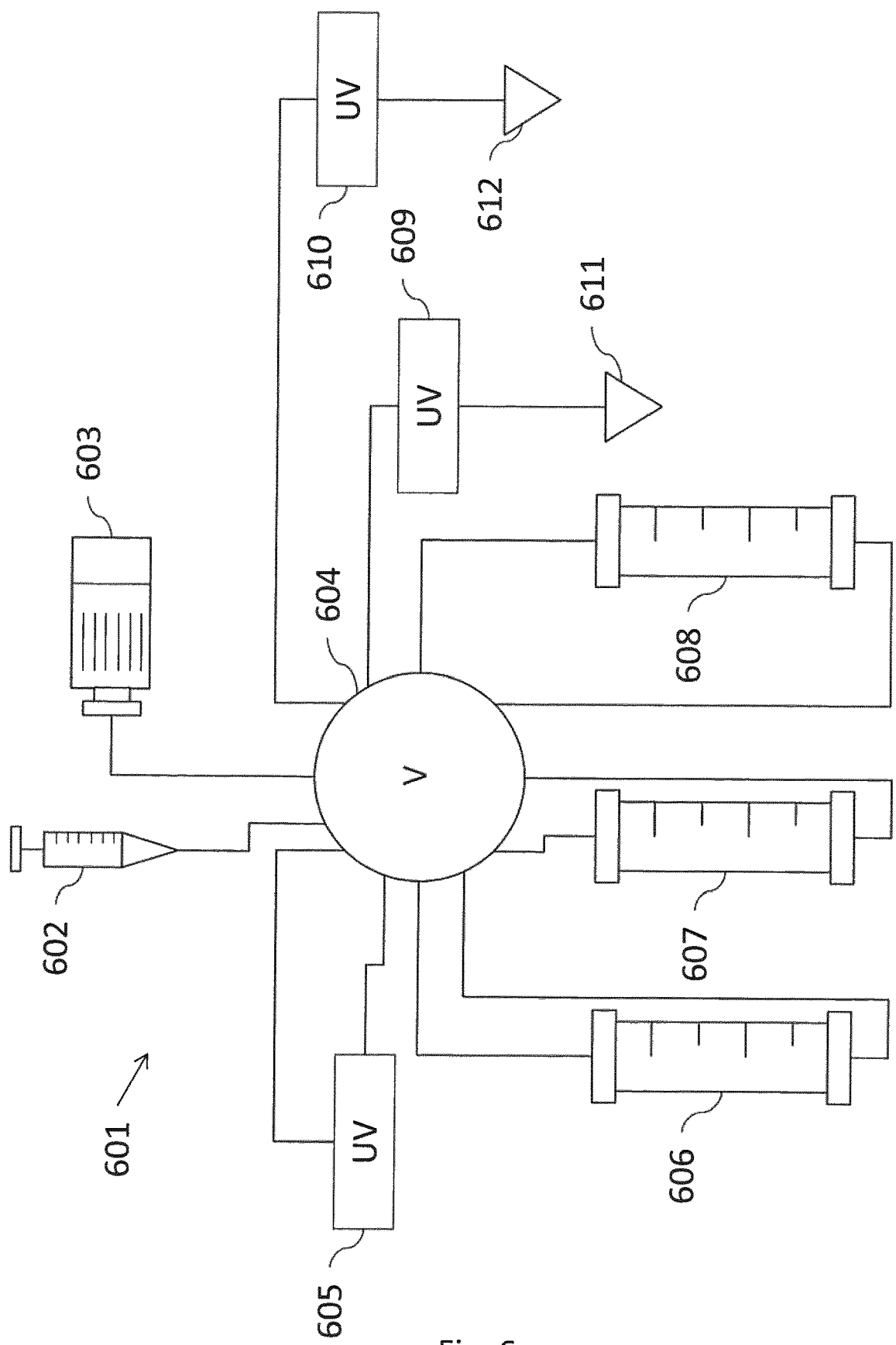
FIG. 6 is an illustration of an exemplary system.

Now with reference made to FIG. 6, an exemplary system will be discussed. The exemplary system is generally designated 601 and comprises a sample pump 602, which is configured to pump a provided sample to a valve 604. A first UV detector 605 is in fluid communication with the valve 604. The valve 604 is in fluid communication with a first column 606, an outlet of the first column 606 is in fluid communication with the valve 604. A second column 607 is in fluid communication with the valve and an outlet of the second column is in fluid communication with a first system outlet 611 via a second UV detector 609. The valve is further in fluid communication with a third column 608, wherein the third column 608 further is connected to a second system outlet 612 via a third UV detector 610. The valve 604 is further in fluid communication with a buffer pump 603.

This exemplary system will now be described by means of two exemplary positions of the valve 604.

In the first position, the valve 604 is configured to provide a first flow path from the sample pump 602 to the first system output 611 via the first UV detector 605, the first column 606, the second column 607, and the second UV detector. In this first position the first UV detector 605 may be arranged upstreams the first column 606. Alternatively, the first UV detector 605 may be connected downstream the first column 606. Whereby, it is possible to achieve a pre-column configuration and a post-column configuration of the first UV detector 605 by means of the valve 604. The valve 604 may also be configured to provide a flow path from the buffer pump 603 to the second system outlet 612 via the third column 608 and the third UV detector 610, whereby it is possible to wash and/or eluate the third column 608.

The arrangement of the first UV-detector 605 in a pre-column or a post-column position may be controlled by means of the valve 604.

In the second position the valve is configured to provide a second flow path from the sample pump 602 to the second system output 612 via the first UV detector 605, the first column 606, the third column 607, and the third UV detector 610. In this second position the first UV detector 605 may be arranged upstreams the first column 606. Alternatively, the first UV detector 605 may be connected downstream the first column 606. Whereby, it is possible to achieve a pre-column configuration and a post-column configuration of the first UV detector 605 by means of the valve 604. The valve 604 may also be configured to provide a flow path from the buffer pump 603 to the first system outlet 611 via the second column 607 and the second UV detector 609, whereby it is possible to wash and/or eluate the second column 607.

The arrangement of the first UV-detector 605 in a pre-column or a post-column position may thus be controlled by means of the valve 604.

From the above it is concluded that the valve 604 in one embodiment of the system 601 may comprise any combination of the following positions:
The first flow path with a pre-column UV detector.
The first flow path with a post-column UV detector.
The second flow path with a pre-column UV detector.
The second flow path with a post-column UV detector.

The invention claimed is:

1. A chromatography system, comprising:
an inlet port for receiving a sample;
an outlet port for delivering the sample;
a detector;
a column; and
a valve in fluid communication with the inlet port, the outlet port, the detector, and the column, wherein the valve is located between the detector and the column;
wherein the valve comprises:
a first position wherein the inlet port is in fluid communication with the outlet port via a first fluid path comprising the detector and the column, wherein the detector is arranged upstream of the column and configured to detect a first detector value;
a second position wherein the inlet port is in fluid communication with the outlet port via a second fluid path comprising the detector and the column, wherein the detector is arranged downstream of the column and configured to detect a second detector value; and
wherein the system is configured to calculate the difference between the first and second detector values.

2. The chromatography system according to claim 1, comprising a further detector connected upstream the inlet port.

3. The chromatography system according to claim 1, wherein the valve is a rotary valve.

4. The chromatography system according to claim 1, wherein the detector is a light absorbance detector.

5. The chromatography system according to claim 4, wherein the light absorbance detector is a UV detector.

6. A method for a chromatography system, wherein the system comprises an inlet port and an outlet port, the method comprising:
connecting by a valve a first flowpath between the inlet port and the outlet port, wherein the first flowpath comprises a detector and a column, wherein the detector is arranged upstream of the column, and the valve is located between the detector and the column;
measuring a first detector value, upon connecting the first flowpath;
connecting by the valve a second flowpath between the inlet port and the outlet port, wherein the second flowpath comprises the detector and the column, wherein the detector is arranged downstream of the column, and the valve is located between the detector and the column;
measuring a second detector value, upon connecting the second flowpath; and
determining the difference between the first detector value and the second detector value.

7. The method for a chromatography system according to claim 6, wherein the system comprises a further detector arranged upstream the inlet port, the method further comprises:
measuring a third detector value by means of the further detector, upon connecting the first flowpath; and measuring a fourth detector value by means of the further detector, upon connecting the second flowpath.

8. The method for a chromatography system according to claim 7, further comprising:
calculating a difference between the third detector value and the first detector value.

9. The method for a chromatography system according to claim 7, further comprising:
calculating a difference between the fourth detector value and the second detector value.

* * * * *